United States Patent
Brandenberger et al.

(10) Patent No.: US 10,457,060 B2
(45) Date of Patent: Oct. 29, 2019

(54) DROP-ON-DEMAND INKJET PRINT BAR

(71) Applicant: MOUVENT AG, Solothurn (CH)

(72) Inventors: Peter Brandenberger, Bellach (CH); Marcel Galliker, Schenkon (CH); Pierino Pierantozzi, Grenchen (CH); Walter Urech, Seengen (CH)

(73) Assignee: MOUVENT AG, Solothurn (CH)

( * ) Notice: Subject to any disclaimer, the term of this patent is extended or adjusted under 35 U.S.C. 154(b) by 0 days.

(21) Appl. No.: 15/746,591

(22) PCT Filed: Jul. 23, 2015

(86) PCT No.: PCT/CH2015/000108
§ 371 (c)(1),
(2) Date: Jan. 22, 2018

(87) PCT Pub. No.: WO2017/011923
PCT Pub. Date: Jan. 26, 2017

(65) Prior Publication Data
US 2018/0215167 A1 Aug. 2, 2018

(51) Int. Cl.
*B41J 2/155* (2006.01)
*B41J 2/175* (2006.01)
(Continued)

(52) U.S. Cl.
CPC .......... *B41J 2/17596* (2013.01); *B33Y 80/00* (2014.12); *B41J 2/04541* (2013.01); *B41J 2/155* (2013.01);
(Continued)

(58) Field of Classification Search
CPC .... B41J 2/04541; B41J 2/155; B41J 2/16552; B41J 2/1707; B41J 2/175; B41J 2/17509;
(Continued)

(56) References Cited

U.S. PATENT DOCUMENTS

| 4,658,272 A | 4/1987 | Toganoh et al. |
| 5,646,658 A | 7/1997 | Thiel et al. |

(Continued)

FOREIGN PATENT DOCUMENTS

| CN | 103722890 A | 4/2014 |
| EP | 0 870 622 A1 | 10/1998 |

(Continued)

OTHER PUBLICATIONS

European Office Action dated May 3, 2019 received in corresponding European Application No. 15 745 367.1.

*Primary Examiner* — Anh T Vo
(74) *Attorney, Agent, or Firm* — Birch Stewart Kolasch & Birch, LLP

(57) ABSTRACT

A print bar comprises a mounting assembly and a plurality of drop-on-demand inkjet print modules mounted to the mounting assembly. The modules comprise conduits for continuously circulating ink. Each of the modules comprises a drop-on-demand inkjet print head and a local element for controlling the ink pressure, assigned to the print head. The print bar further comprises control circuitry assigned to the print heads of the modules for controlling the local elements for controlling the ink pressure and ink release by the print head. An optimum printing result at high frequency may be obtained from every print head as the ink delivered to the print head is locally brought to a desired pressure. A modular buildup is achieved, which means that new printers may be easily designed and built from a comparably small number of components to be held available. Maintenance is similarly facilitated. Scalability is excellent.

17 Claims, 5 Drawing Sheets

(51) Int. Cl.
*B41J 2/045* (2006.01)
*B41J 2/18* (2006.01)
*B41J 2/19* (2006.01)
*B41J 29/02* (2006.01)
*B33Y 80/00* (2015.01)
*B41J 2/165* (2006.01)
*B41J 2/17* (2006.01)
*B41J 2/14* (2006.01)

(52) U.S. Cl.
CPC ........... *B41J 2/16552* (2013.01); *B41J 2/175* (2013.01); *B41J 2/1707* (2013.01); *B41J 2/17509* (2013.01); *B41J 2/18* (2013.01); *B41J 2/19* (2013.01); *B41J 29/02* (2013.01); *B41J 2002/14419* (2013.01); *B41J 2202/12* (2013.01); *B41J 2202/20* (2013.01)

(58) Field of Classification Search
CPC ... B41J 2/17596; B41J 2/18; B41J 2/19; B41J 2/2202; B41J 29/02; B33Y 80/00
See application file for complete search history.

(56) References Cited

U.S. PATENT DOCUMENTS

| | | | |
|---|---|---|---|
| 6,007,193 A * | 12/1999 | Kashimura | B41J 2/1707 347/18 |
| 6,069,640 A | 5/2000 | Kubatzki | |
| 8,132,902 B2 * | 3/2012 | Shibata | B41J 2/17556 347/89 |
| 2005/0219282 A1 * | 10/2005 | Kachi | B41J 2/175 347/6 |
| 2007/0070103 A1 | 3/2007 | Akune et al. | |
| 2009/0002407 A1 | 1/2009 | Karin et al. | |
| 2009/0091779 A1 | 4/2009 | Ishinaga et al. | |
| 2011/0069118 A1 * | 3/2011 | Ohzeki | B41J 2/14233 347/44 |
| 2011/0221820 A1 | 9/2011 | Shibata | |
| 2011/0316942 A1 | 12/2011 | Koyama | |
| 2012/0019605 A1 | 1/2012 | Devries et al. | |
| 2012/0188314 A1 * | 7/2012 | Akiyama | B41J 2/175 347/85 |
| 2014/0104350 A1 | 4/2014 | Urabe | |
| 2015/0165782 A1 * | 6/2015 | Marler | B41J 2/17596 347/85 |

FOREIGN PATENT DOCUMENTS

| | | |
|---|---|---|
| EP | 2 371 569 A1 | 10/2011 |
| EP | 2 703 168 A1 | 3/2014 |
| JP | 2006-264328 A | 10/2006 |
| JP | 2007-90690 A | 4/2007 |
| JP | 2007-160916 A | 6/2007 |
| JP | 2009-149057 A | 7/2009 |
| JP | 2010-214819 A | 9/2010 |
| JP | 2011-183689 A | 9/2011 |
| JP | 2012-218358 A | 11/2012 |
| JP | 2014-162104 A | 9/2014 |
| WO | WO 2007/015230 A2 | 2/2007 |
| WO | WO 2013/105968 A2 | 7/2013 |
| WO | WO 2015/082933 A1 | 6/2015 |
| WO | WO 2015/098220 A1 | 7/2015 |
| WO | WO 2016/013297 A1 | 1/2016 |

* cited by examiner

DROP-ON-DEMAND INKJET PRINT BAR

TECHNICAL FIELD

The invention relates to a print bar comprising a mounting assembly and a plurality of drop-on-demand inkjet print modules mounted to the mounting assembly.

BACKGROUND ART

Inkjet printers include an ink path from an ink supply to a print head that includes nozzles from which ink drops are ejected. Ink drop ejection can be controlled by pressurizing ink in the ink path with an actuator, for example, a piezoelectric deflector, a thermal bubble jet generator, or an electrostatically deflected element. A typical print head has a line or an array of nozzles with a corresponding array of ink paths and associated actuators, and drop ejection from each nozzle can be independently controlled. In a so-called "drop-on-demand" print head, each actuator is fired to selectively eject a drop at a specific location on a medium. The print head and the medium can be moving relative one another during a printing operation.

In order to achieve larger print widths many commercial inkjet printers comprise print bars that include a mounting assembly and a plurality of print heads that are mounted to the mounting assembly and that are typically arranged in linear or staggered relationship. A printer may include a plurality of print bars.

To give an example, US 2007/0070103 A1 (Konica Minolta) relates to a line type inkjet printer wherein a plurality of ink nozzles are arranged over a length corresponding to the width of a printing medium. It comprises a drive signal generating circuit for each head that outputs the signal for emitting the ink particles at a timed interval confirming to a timing signal. The line head is provided with a plurality of head modules in staggered arrangement, each head module being made up of a set of a plurality of print heads, each head having a head position adjusting mechanism. Ink is fed to an intermediate tank by means of a pressure pump. From the intermediate tank the ink passes a filter and is fed to an ink flow path that is common to all the head modules. The document suggests to replace only the print head instead of entire head modules. Thanks to the head position adjusting mechanism the time required for readjustment of the replaced head is reduced.

Having a central ink supply for all the print bars, spare parts for the central supply as well as for the local print bars and print heads, including the print heads themselves, must be held available. Furthermore, designing a specific printer and in particular its central ink supply in such a way that all print heads are reliably supplied with ink from an ink cartridge via an intermediate tank and comparably long conducts is a demanding task, especially if high printing frequencies shall be achieved. This means that both designing and building a new printer having a configuration that differs from a previously designed printer as well as maintenance of the printer is time consuming and expensive.

SUMMARY OF THE INVENTION

It is the object of the invention to create a print bar pertaining to the technical field initially mentioned, that facilitates the design, build up and maintenance of ink jet printers.

The solution of the invention is specified by the features of claim 1. According to the invention, the modules comprise conduits for continuously circulating ink and each of the modules of the print bar comprises a) a drop-on-demand inkjet print head and
b) a local element for controlling the ink pressure, assigned to the print head.

The print bar further comprises control circuitry assigned to the print heads of the modules for controlling the local elements for controlling the ink pressure and ink release by the print heads.

The print bar comprises at least two inkjet print modules, each of the modules including a print head. A preferred number of modules is 4 or more. A printer may include a number of print bars that are e. g. arranged in a linear relationship, in order to achieve large printing widths.

In contrast to the prior art, where a single mechanism for controlling the ink pressure, such as an ink pump, supplies ink to a number of drop-on-demand print heads each of the modules comprises not only an associated (single) drop-on-demand print head but as well a local element for controlling the ink pressure, i. e. processing (exclusively) the ink delivered to this print head. The local element is part of the module, the element and the print head are mechanically supported by a common structure and they are both replaced if the entire module is replaced.

Furthermore, the print bar comprises control circuitry assigned to the specific print heads of the print bar. Components of the control circuitry may be arranged on the individual modules and assigned to the respective print head. All or some components of the control circuitry may also be assigned to a plurality of print heads of the print bar. In this case, they are preferably attached to the mounting assembly of the print bar.

An optimum printing result at high frequency may be obtained from every print head as the ink delivered to the print head is locally prepared, i. e. brought to a desired pressure. Due to the fact that the control circuitry is as well assigned to the individual print bar a modular buildup is achieved, which means that new printers may be easily designed and built from a comparably small number of components to be held available. The size of the printer may be easily scaled up. Maintenance is similarly facilitated.

Preferably, each of the modules further comprises a local degassing device assigned to the print head. Again, this allows for local preparation, thus for optimum printing results and perfect scalability.

Alternatively, the ink delivered to several print heads is degassed by a single degasser. This degasser may e. g. be assigned to the print bar or to a subset of print heads assigned to a print bar.

Preferably, the degassing device comprises a hollow fibre bundle. This allows for effectively removing gas bubbles using compact degasser modules.

Advantageously, each of the modules further comprises a local ink heating device assigned to the print head. Having the heating device close to the print head ensures uniform ink temperature at different print heads and therefore allows for optimum printing results.

Alternatively, the ink delivered to several print heads is brought to a desired temperature by a single ink heating device. This device may e. g. be assigned to the print bar or to a subset of print heads assigned to a print bar.

Advantageously, each of the modules further comprises a local ink buffer for balancing the ink pressure at varying ink demand of the print head. The ink buffer may comprise a spring-loaded membrane that allows for temporarily reducing the volume of the buffer reservoir when the rate of ink drawn by the print head is high. If the ink rate drops, the membrane will assume its normal form, due to the spring, and the volume of the ink buffer will return to its nominal value.

Preferably, the ink buffer is arranged upstream of the print head whereas a pump is arranged downstream of the print head.

Preferably, the print bar further comprises an ink manifold connected to the plurality of modules, for providing ink to the modules. The manifold provides the modules of a print bar with ink. Usually, it will also return ink that has not been used. Apart from feeding and returning ink, the manifold may serve further purposes and include e. g. lines for guiding cooling fluids, lines for guiding fluids for flushing components of the system such as the print heads, lines for ventilation, vacuum lines etc. Furthermore, the manifold may contribute to the mechanical stability of the print bar.

Advantageously, the manifold comprises a first duct for feeding ink, a second duct for returning ink, and a third duct for a flushing fluid, the first duct, the second duct and the third duct running parallel to each other in a longitudinal direction of the manifold, and in that tube-shaped fittings for the connection of external lines extend essentially perpendicular to the first duct, the second duct and the third duct they are connected to.

This geometry allows for a very compact buildup of the manifold with excellent access to the fittings. Preferably, the ducts as well as the manifold itself have an essentially constant cross section along the longitudinal direction. Further ducts, e. g. for the purposes mentioned above, may be arranged similar to the aforementioned first, second and third ducts. Depending on the purpose, the cross sections of the ducts may differ from each other, this applies to the cross-sectional shape as well as dimension.

Preferably, longitudinal openings of the first duct, the second duct and the third duct lead into a front face of the manifold. This corresponds to a simple geometry which is compact and may be easily manufactured. Furthermore, the front faces of the manifold may be closed with endpieces, or connected with interface components that allow e. g. the connection to a further manifold of an adjacent print bar or of external supply and return lines.

In a preferred embodiment, a cooling component presenting an essentially planar cooling surface for cooling an integrated circuit is unitarily formed with the manifold, in particular with the first, second and third duct (as well as with further ducts if any). This allows for a simple connection of the cooling component and a compact geometry of the entire manifold. In particular, the integrated circuit is a component for controlling the operation of other components of the print bar such as a Field Programmable Gate Array (FPGA). Further cooling components may be present, including components that are independent from the manifold. These further components may be serially integrated into the same cooling circuit as the integrated planar cooling surface.

Advantageously, the manifold is manufactured by a three-dimensional printing process. Such a process allows for the implementation of complex geometries. In particular, all the ducts and fittings may be manufactured in a single operation. The number of connectors, sealings etc. may be minimized.

In addition to the manifold further components of the print bar may be manufactured entirely or partially by three-dimensional printing. As an example, many components of the print module such as the housing of the degasser, mechanical supports, a carrier for the print head etc. may be manufactured by three-dimensional printing. These components may be formed unitarily to improve the mechanical stability of the print module as well as to reduce the weight of the print module.

Preferably, the plurality of modules is mounted to the mounting assembly in such a way that they are movable along a linear axis. This allows for easily adjusting the longitudinal position of the print heads in order to ensure seamless printing over a large width. Usually, the required adjustment travel will be small. However, positioning accuracy and stability should be very high.

Preferably, the control circuitry comprises a module for the conditioning of image data to be printed by the assigned print head or print heads. The module may be constituted by a dedicated hardware component, dedicated software or a combination of hard- and software. Performing the conditioning at the level of the print bar and/or module, in real time, allows for reducing the computational load that is required on a central level. Furthermore, the ink jet system will automatically scale if further print heads or print bars are added, which means that essentially the same central processing components may be used independent from the number of print bars or print heads. Furthermore, the local circuitry may be tuned to the specific print head(s) used in the print module or print bar, which means that an optimum print result may be achieved, especially at high frequencies, and less modifications will be needed on the central level.

Advantageously, each of the print modules further comprises a local valve for switching between an ink supply and a flushing configuration. This allows for easily flushing the ink lines of a specific print module. The local valve being arranged very close to the print head avoids unnecessary waste of ink.

Preferably, the local element for controlling the ink pressure is a membrane pump. This type of pump is compact and has turned out to be particularly well suited for locally feeding a print head with ink. Other solutions are possible: Depending on the pressure environment, the local element for controlling the ink pressure may be constituted by a meniscus or a controllable valve.

Advantageously, a print bar comprises a mounting assembly and a plurality of inkjet print modules mounted to the mounting assembly, each of the modules comprising an inkjet print head, the print bar including a system for maintaining a predetermined temperature comprising a heat exchanging fluid circuit including ducts arranged within a support structure of the mounting assembly for supporting the inkjet print heads. This allows for efficiently bringing the inkjet print heads to a desired temperature, thus ensuring uniform conditions in all the print heads and thus enabling uniform printing along the entire printing width.

The ducts may be constituted by cavities within a base body or a further component of the support structure. They may also be constituted by additional pipes that are fixedly mounted to the support structure or by a combination of both.

Having such a system is particularly advantageous in connection with a print bar according to the invention that comprises a local element for controlling the ink pressure. Nevertheless, it may also be used in connection with other print bars where the functions of this component are effected by (partly) centralized devices.

In a preferred embodiment, the support structure of the mounting assembly comprises carriers for mounting the print heads. These are specific elements that provide accommodations for receiving the print heads. Particularly preferred each print head is assigned to an individual carrier, i. e. each carrier comprises a single accommodation for accommodating a single print head. In this case, the number of carriers in a print bar will correspond to the number of print heads of the print bar.

Advantageously, first ducts of the heat exchanging fluid circuit are arranged within the carriers. This allows for controlling the temperature of the element that is immediately holding the print head, i. e. the temperature of the print head may be precisely controlled.

In an embodiment of the invention, the support structure comprises a linear guide for supporting the carriers for mounting the inkjet print heads such that the modules are movable in a longitudinal direction along the linear guide, wherein the heat exchanging fluid circuit includes second ducts arranged within the linear guide, extending in longitudinal direction.

Employing the linear guide allows for an efficient distribution of a heat exchanging fluid without increasing the space required for the print bar. Furthermore, the linear guide itself will also be brought to the desired temperature, thus improving positional stability of the mechanism supporting the inkjet print heads.

In a variant of this embodiment, the carriers as well as the linear guide are provided with ducts of the heat exchanging fluid circuit.

Preferably, the linear guide comprises two longitudinal hollow rails, the second ducts being arranged within the hollow rails; the carriers of the inkjet print heads are slidably mounted on the rails, and radial bores are provided in the longitudinal hollow rails leading to the second ducts. The radial bores cooperate with orifices provided at surfaces of the carriers interacting with the rails. Due to the fact that the required adjustment travel is small the sealing against a loss of cooling fluid is not critical. Even if the position of the carriers is slightly changed with respect to the rails there will still be a fluid connection between the rails and the carriers. Both rails or just a single rail may be provided with the second ducts. If both rails are used, one of the rails may be used for feeding the heat exchanging fluid, whereas the other rail is used for returning the heat exchanging fluid.

In an alternative embodiment, the longitudinal hollow rails may be provided by ducts running along the hollow rails that are connected to the heat exchanging fluid circuit, but not directly exchanging heat exchanging fluid with the carriers of the inkjet print heads. The ducts of the hollow rails may be e. g. in serial connection with the entire section assigned to the carriers, upstream and/or downstream of the carriers.

In a preferred embodiment, a single heat exchanging fluid line serially passes the inkjet print heads mounted to the mounting assembly.

Preferably, the heat exchanging fluid circuit includes ducts arranged within a manifold for providing ink to the modules. In particular, these ducts run parallel to the ink lines of the manifold. This ensures that the ink transported in the manifold is brought to a uniform temperature along essentially the entire transport path. Furthermore, it allows for simplifying the geometry of the entire print bar, and reducing the number of tubes or pipes. Further devices for heat exchange, such as the aforementioned cooling component presenting an essentially planar cooling surface for cooling an integrated circuit may be integrated into the heat exchanging fluid circuit.

In a preferred embodiment of the invention, each of the individual print modules comprises a carrier for movably supporting the module on the mounting assembly. The print head is attached to the carrier, and the local element for controlling the ink pressure is mechanically attached to the print head.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
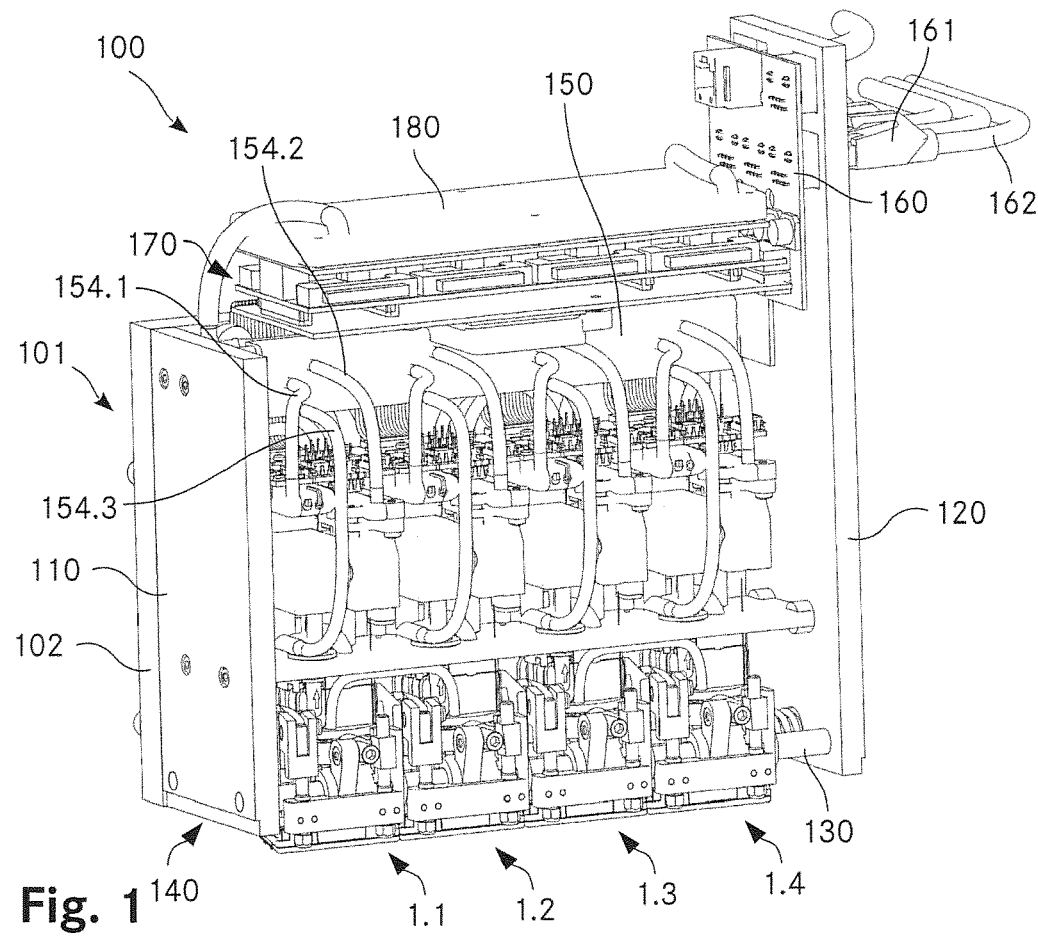
FIG. 1 An oblique view of an embodiment of a print bar according to the invention.
Figure 2:
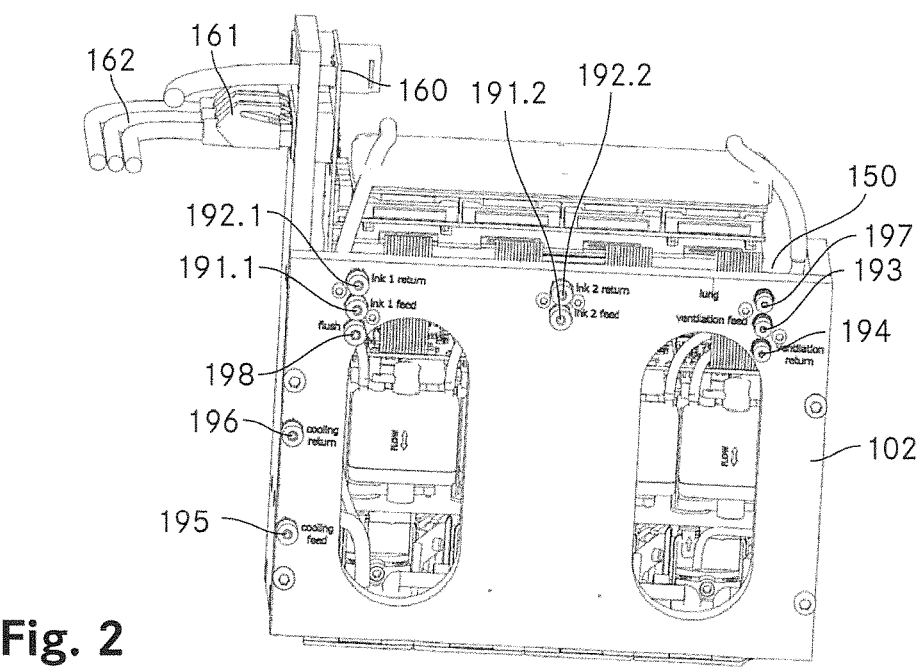
FIG. 2 a side view of the rear side of the print bar.

The FIG. 1 is an oblique view of an embodiment of a print bar according to the invention, the FIG. 2 shows a side view onto the rear side of the print bar.

The print bar 100 comprises a frame 101 that includes two base plates 110, 120 that are arranged in parallel, constituting the lateral parts of the frame 101 as well as a back plate 102 connecting the base plates 110, 120. At their lower ends, the two base plates 110, 120 are connected to each other by longitudinal rails 130, 140. A manifold 150 connects the two base plates 110, 120 at their upper ends and thus constitutes a further structural element of the frame 101. Four print modules 1.1 . . . 1.4 are mounted to the frame 101.

On top of the manifold 150 the print bar 100 carries a vertical connection panel 160, circuit boards 170 that extend horizontally within the footprint of the frame 101 as well as a cooling plate 180 arranged above the circuit boards 170, the footprint of which essentially corresponding to that of the circuit boards 170 and the frame 101. The cooling plate 180 cools the circuitry on the circuit boards 170, including the fire pulse generator. The connection panel 160 features a number of connectors 161 for connecting data lines 162 linking the print bar 100 to a central control unit of the inkjet printer.

Hydraulic connectors are accessible from the back plate 102 of the frame 101 of the print bar 100. They include the following:

two feed lines 191.1, 191.2 for ink;
two return lines 192.1, 192.2 for ink;
a ventilation feed line 193 and a ventilation return line 194;
a cooling feed line 195 and a cooling return line 196;
a vacuum line 197; and
a flush line 198.

The embodiment described in connection with FIG. 17 comprises two separate ink feeds each supplying two of the print modules 1.1, 1.2; 1.3, 1.4 as described in more detail below. It is to be noted that an alternative embodiment may comprise only a single ink feed for all the print modules 1.1 . . . 1.4.

The connectors are connected to respective conduits of the manifold 150 directly or by means of tubes as described in more detail below.

Figure 3:
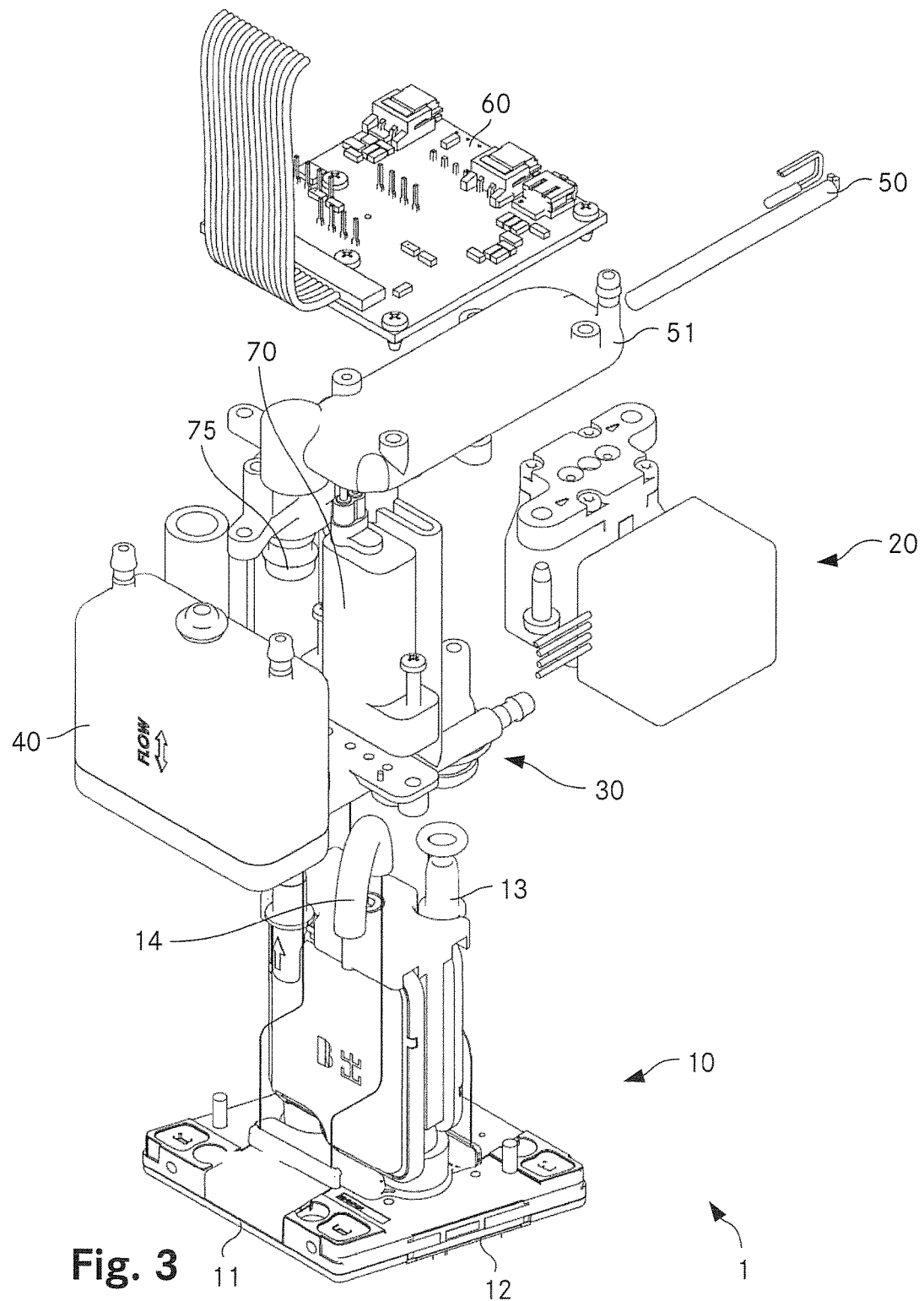
FIG. 3 an oblique exploded view of a print module of the print bar.

The FIG. 3 is an oblique exploded view of a print module of the print bar. The print module 1 comprises a piezo-electric drop-on-demand ink jet print head 10 known as such. It features a base plate 11 with an array 12 of nozzles for ejecting ink. The ink is supplied by a membrane pump 20 arranged on top of the print head 10. The ink feed and return connectors 13, 14 of the print head 10 are connected to the pump 20 or a return line, respectively, by a distribution module 30.

A degasser 40 is mounted to the distribution module 30. It comprises a hollow fibre bundle and is connected to a vacuum line. The ink delivered to the degasser 40 is previously brought to a desired temperature by a heater 50. The housing 51 of the heater 50 carries an interface board 60 on top. The print module 1 further comprises a valve 70 integrated to the distribution module 30 for switching between an ink supply and a flushing configuration.

An ink buffer 75 is arranged in fluid connection after the heater 50. It comprises a spring-loaded membrane that allows for temporarily reducing the volume of the buffer reservoir when the rate of ink drawn by the print head is high. This allows for balancing the ink pressure in the print head section. If the ink rate drops, the membrane will assume its normal form, due to the spring, and the volume of the ink buffer 75 will return to its nominal value.

Figure 4:
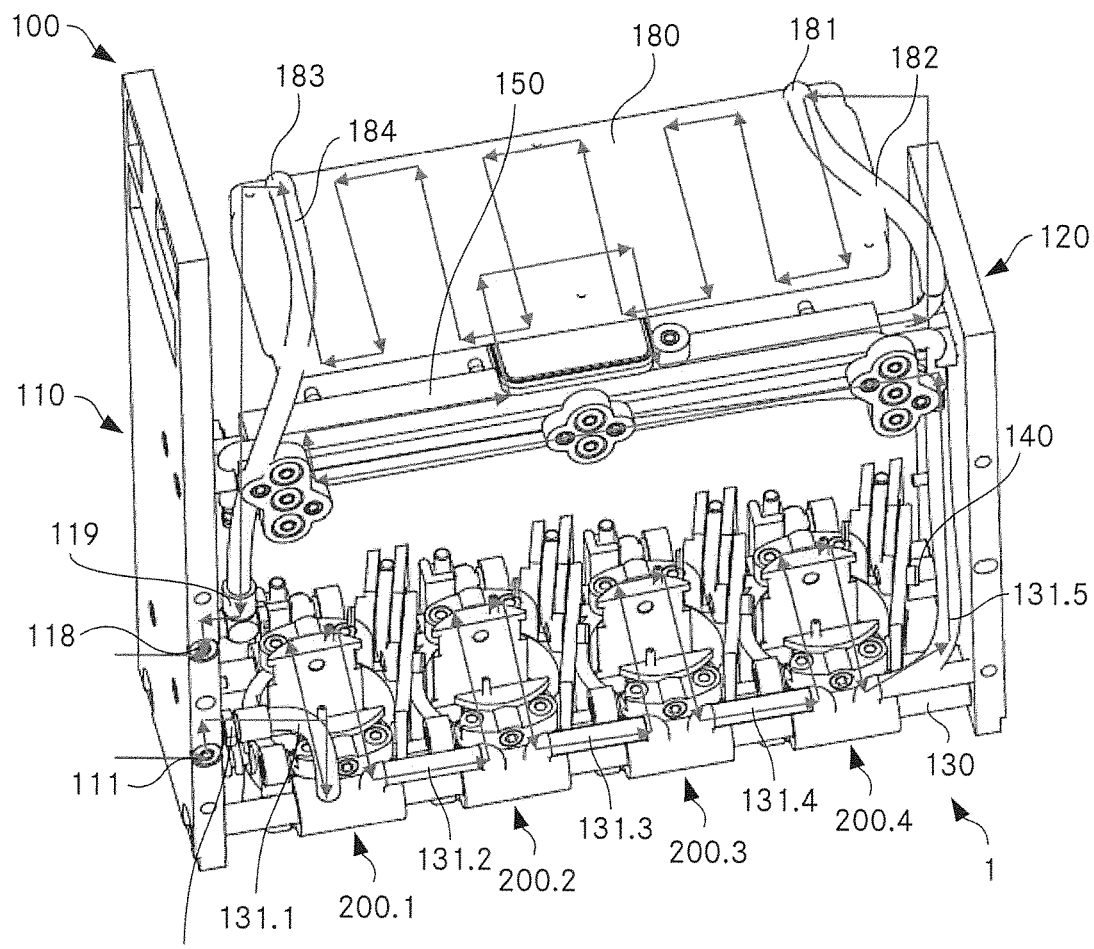
FIG. 4 an oblique view of the components of the cooling system of the print bar.
Figure 5:
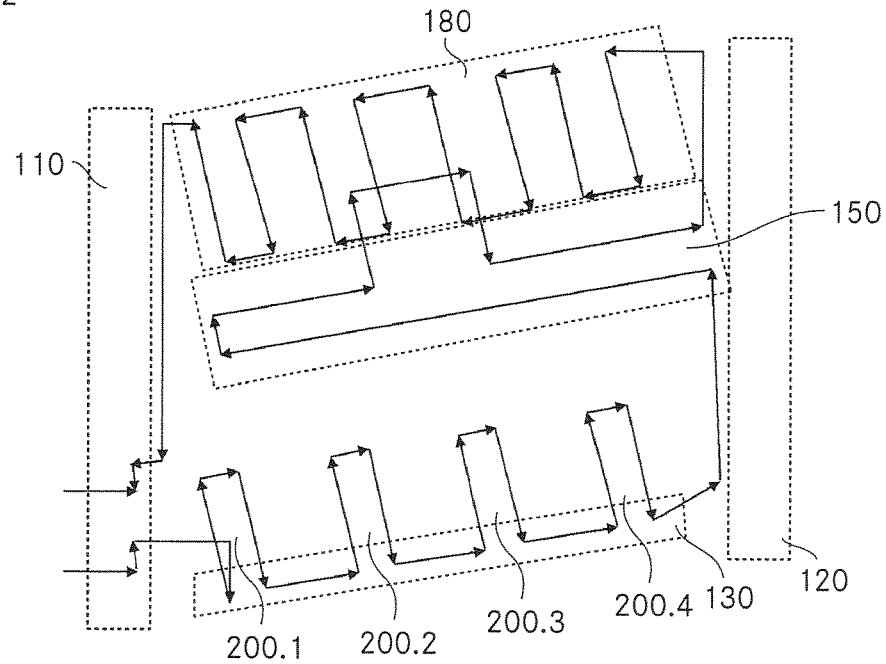
FIG. 5 a schematic view of the liquid flow in the cooling system.

The cooling system of the print bar according to the invention is described in connection with FIGS. 4-7. The FIG. 4 is an oblique view of the components of the cooling system of the print bar, the FIG. 5 is a schematic view of the liquid flow in the cooling system.

With respect to the print bar 100, the cooling system comprises a single circuit which serially passes through the components to be cooled. The cooling fluid is supplied to a feed connector 111 provided in one of the lateral base plates 110, from a heat exchanging device known as such that is external to the print head. A conduit within the base plate 110 leads to a connector 112 arranged on the inside of the base plate 110. A flexible tube 131.1 links the connector 112 with a feed connector of the first carrier 200.1. The cooling fluid is guided serially through the carriers 200.1, 200.2, 200.3, 200.4 employing conduits within the carriers and further flexible tubes 131.2, 131.3, 131.4 as described in more detail below.

The last carrier 200.4 is connected to a feed connector of the manifold 150 by a further flexible tube 131.5. The feed connector of the manifold 150 is linked to a line running along the manifold 150, the cooling fluid thus exchanging heat with other lines of the manifold 150 running parallel or opposite. On the other end of the manifold, the line is connected to a second line running back, in the opposite direction and passing an FPGA cooler as described in more detail below.

The end of the respective line of the manifold 150 is connected to a tube 182, which is linked to a feed connector 181 of the cooling plate 180. Another tube 184 connects a return connector 183 of the cooling plate 180 to a connector 119 of the side plate 110. A conduit arranged within this side plate 110 connects the connector 119 to a return connector 118 arranged on a lateral face of the side plate 110.

Figure 6:
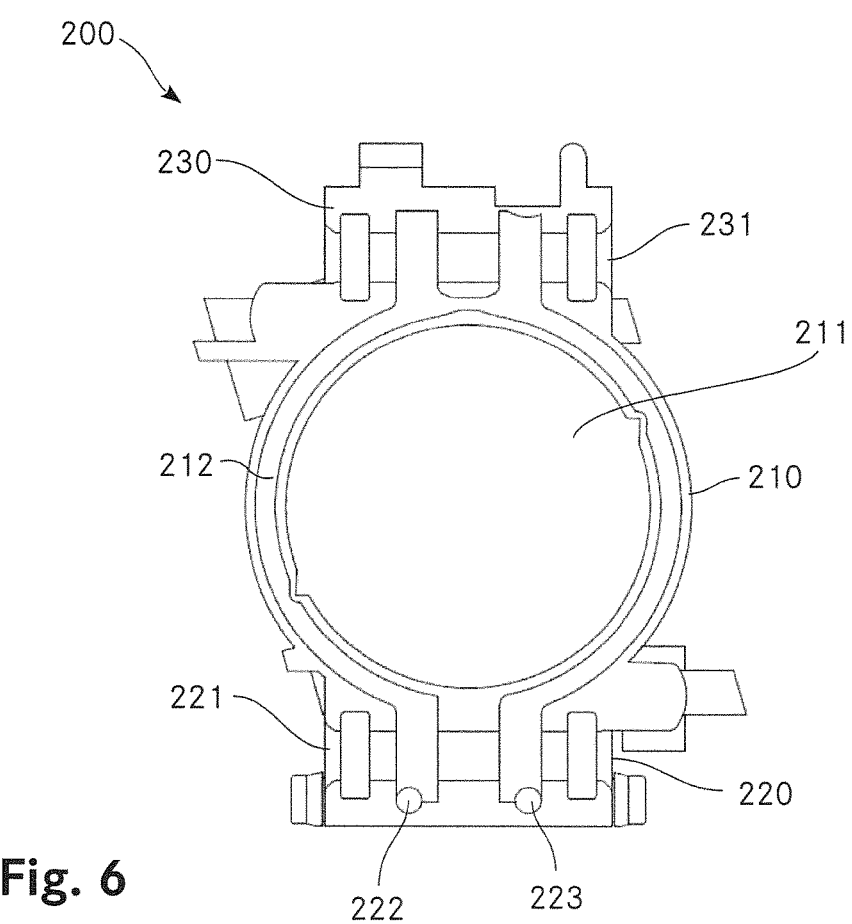
FIG. 6 a top view of a print head carrier of the print module.

The FIG. 6 is a top view of a print head carrier of the print module. The carrier 200 comprises a holding section 210 as well as a first tubular section 220 and a second tubular section 230 that are arranged on both sides of the holding section 210. Each of the tubular sections 220, 230 comprises a bore 221, 231, the bores running parallel to each other. Their geometry is chosen such that they may cooperate with the two rails 130, 140 (cf. FIG. 4), in such a way that the carrier 200 is slidably supported on the two rails 130, 140. The holding section 210 comprises a circular opening 211, which is designed to accommodate a corresponding section of a print head (cf. FIG. 1). The further components of the print module are mechanically coupled to the print head (cf. FIG. 3) and therefore also held by the carrier 200.

The carrier 200 comprises further elements for mechanically adjusting the position of the carrier 200 with respect to the rails 130, 140. The specific design of these elements is not relevant for the present invention.

The holding section 210 encompassing the circular opening 211 comprises a conduit 212 leading from an infeed connector 222 to an outfeed connector 223. Both connectors 222, 223 are arranged in the region of the bore 221 accommodating one of the rails 130. The conduit 212 encompasses substantially the entire circumference of the opening 211.

Figure 7A:
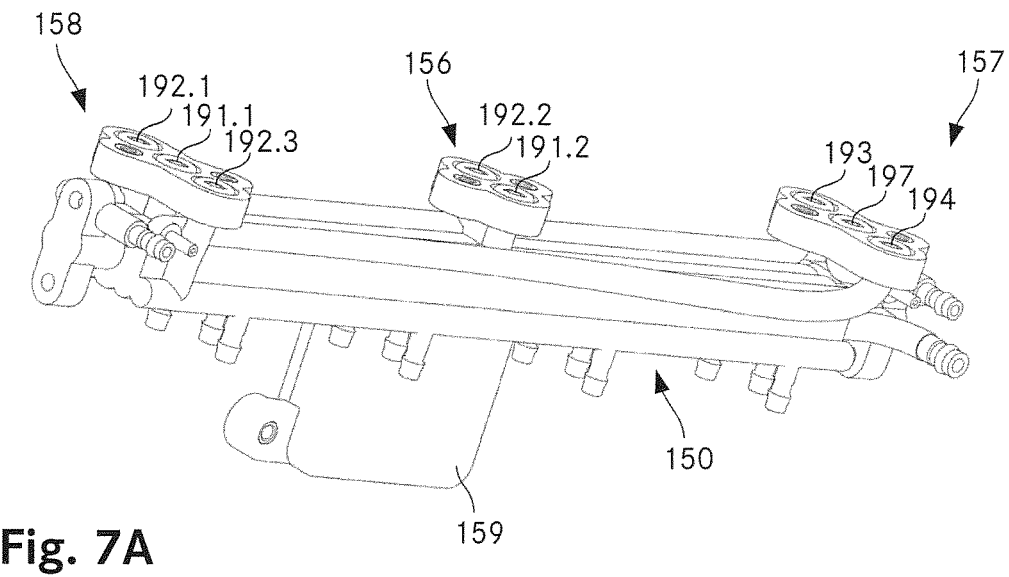
FIG. 7A an oblique view of the manifold of the print bar with two attached end pieces.
Figure 7B:
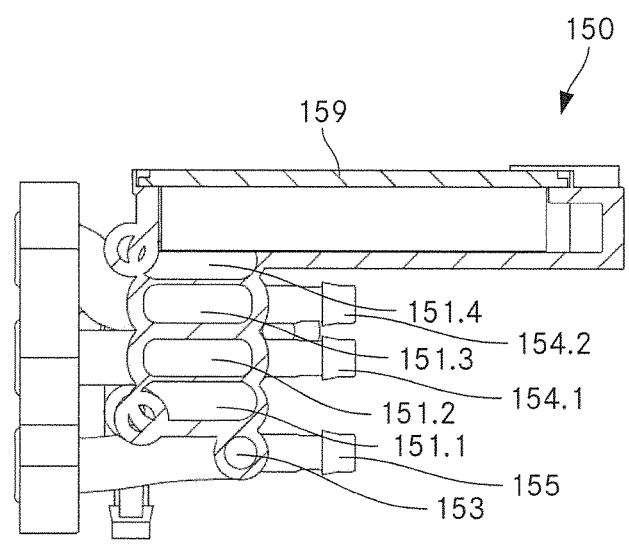
FIG. 7B a cross-sectional view of the manifold.
Figure 7C:
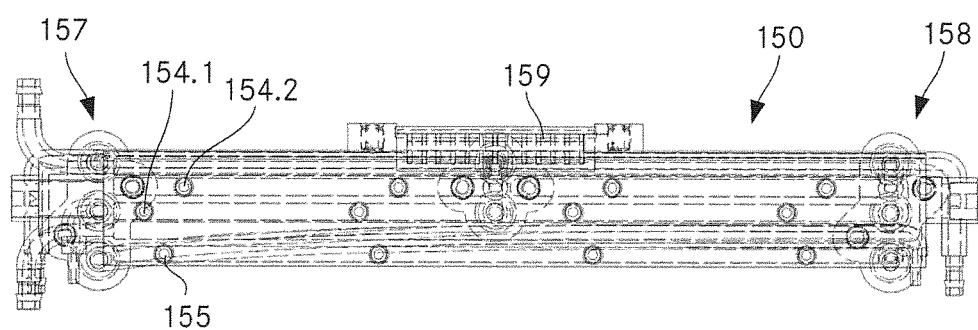
FIG. 7C a side view of the manifold with the end pieces.

The FIG. 7A is an oblique view of the manifold of the print bar with two attached end pieces, the FIG. 7B shows a cross-sectional view of the manifold, the FIG. 7C is a side view of the manifold with the end pieces. The manifold 150 is unitarily formed and manufactured employing a 3d printing process. It comprises a number of straight ducts as well as an FPGA cooler section 159. The following ducts are present in the manifold 150. Four ducts 151.1, 151.2, 151.3, 151.4 having an elongated cross section, and being arranged in a vertically stacked manner, the elongated axis running in a horizontal direction. The lowermost duct 151.1 of these four ducts is a feed line for a cooling medium, the next upper duct 151.2 is a feed line for ink. This relative arrangement ensures that the ink is cooled along essentially its entire feed line. The next upper duct 151.3 is the return line for ink, the uppermost duct 151.4 of these four ducts is the return line for the cooling medium (cf. the description above, in connection with FIGS. 4, 5).

The two ducts 151.2, 151.3 for feeding and returning ink are connected to the connectors for the feed line 191.1 and return line 192.1 for ink 1 shown in FIG. 2. They supply the two print modules 1.1, 1.2 on the left hand side. In the right half, the corresponding ducts 151.2, 151.3 are connected to the connectors for the feed line 191.2, 192.2 for ink 2.

The manifold further comprises a duct 153 for a flush line, arranged below the four stacked elongated ducts 151.1 . . . 4.

Further ducts, namely for a vacuum line for connecting degasser lungs and for ventilation feed and return lines are also provided in the manifold but not visible in FIG. 7A-C.

The FPGA cooler is arranged above the four stacked ducts 151.1 . . . 4, in a central section of the manifold 150. Its longitudinal extension amounts to about a quarter of the total length of the manifold 150.

The mentioned ducts 151.1 . . . 4, 153 lead into the front and back face of the manifold 150. They are connected to feed or return lines by suitable interface blocks that may be attached to the front and back face or in a region along the manifold 150, respectively. Such interface blocks are in the form of endpieces 157, 158 and a connector piece 156, providing connectors that are in fluid connection with the connectors on the back plate 102 (cf. FIG. 2). If required, two adjacent manifolds may be directly connected by a connection block for joining the two adjacent manifolds, connecting the corresponding ducts of the manifolds with each other.

The manifold 150 further features four sets of connectors 154.1, 154.2 for connecting the ink feed (connector 154.1) and ink return line (connector 154.2) to the individual print modules. Similarly, the manifold 150 comprises four connectors 155 for connecting the print modules to the flush line. The manifold 150 further comprises sets of barbs for connecting the ventilation and the vacuum line for the degasser.

The ink is distributed from a central tank to the individual print heads as follows. It is fed from the central tank to the manifold 150 of the respective print bar 100 through suitable tubing connected to the connector of the ink feed line 191.1, 191.2 (cf. FIG. 1). Depending on the specific design of the ink jet printer, this feeding may be supported by one or a plurality of pumps and entail the passage of one or several intermediate tanks. The mentioned connector is connected to the endpiece 158 or the connector piece 156 which are attached to the manifold 150. The ink is transported through the duct 151.2 which is the feed line for ink to the respective connector 154.1. This connector is connected to a corresponding connector of the print module 1 (cf. FIG. 1). Locally in the print module, the ink is degassed and brought to a desired temperature. Supply of the ink and feeding to the print head 10 is controlled by local circuitry and effected inter alia by a local pump 20. Excess ink is transported back passing essentially the same stations, employing corresponding return lines.

The invention is not restricted to the described embodiment. In particular, the print module may be designed in a different way. In a further embodiment, the individual elements of the module may be manufactured entirely or partially by three-dimensional printing, and some or all of the elements may be merged to corresponding units, which allows for reducing the extension and weight of the module and possibly also the manufacturing costs.

In summary, it is to be noted that the invention provides a print bar that facilitates the design, build up and maintenance of ink jet printers.

The invention claimed is:

1. A print bar comprising a mounting assembly and a plurality of drop-on-demand inkjet print modules mounted to the mounting assembly, the modules comprising conduits for continuously circulating ink and each of the modules comprising:
   a) a drop-on-demand inkjet print head;
   b) a local element for controlling the ink pressure, assigned to the print head, processing ink delivered to this print head;
the print bar further comprising control circuitry assigned to the print heads of the modules for controlling the local elements of the pint heads of the plurality of print modules, for individually and locally controlling the ink pressure and ink release by the print heads.

2. The print bar as recited in claim 1, wherein each of the modules further comprising a local degassing device assigned to the print head.

3. The print bar as recited in claim 2, wherein the local degassing device comprising a hollow fibre bundle.

4. The print bar as recited in claim 1, wherein each of the modules further comprising a local ink heating device assigned to the print head.

5. The print bar as recited in claim 1, wherein each of the modules further comprising a local ink buffer for balancing the ink pressure at varying ink demand of the print head.

6. The print bar as recited in claim 1, further comprising an ink manifold connected to the plurality of modules, for providing ink to the modules.

7. The print bar as recited in claim 6, wherein the manifold comprising a first duct for feeding ink, a second duct for returning ink, and a third duct for a flushing fluid, the first duct, the second duct and the third duct running parallel to each other in a longitudinal direction of the manifold, tube-shaped fittings for the connection of external lines extending essentially perpendicular to the first duct, the second duct and the third duct they are connected to.

8. The print bar as recited in claim 7, wherein longitudinal openings of the first duct, the second duct and the third duct leading into a front face of the manifold.

9. The print bar as recited in claim 6, wherein a cooling component presenting an essentially planar cooling surface for cooling an integrated circuit is unitarily formed with the manifold.

10. The print bar as recited in claim 6, wherein the manifold is manufactured by a three-dimensional printing process.

11. The print bar as recited in claim 1, wherein the plurality of modules are mounted to the mounting assembly in such a way that they are movable along a linear axis.

12. The print bar as recited in claim 1, wherein the control circuitry comprising a module for the conditioning of image data to be printed by the assigned print head.

13. The print bar as recited in claim 1, each of the print modules further comprising a local valve for switching between an ink supply and a flushing configuration.

14. The print bar as recited in claim 1, wherein the local element for controlling the ink pressure is a membrane pump.

15. A print bar, comprising a mounting assembly and a plurality of inkjet print modules mounted to the mounting assembly, each of the modules comprising an inkjet print head, the print bar comprising a system for maintaining a predetermined temperature comprising a heat exchanging fluid circuit including ducts arranged within a support structure of the mounting assembly for supporting the inkjet print heads, wherein the support structure of the mounting assembly comprises carriers for mounting the print heads and each print head is assigned to an individual carrier and wherein first ducts of the heat exchanging fluid circuit are arranged within the carriers.

16. The print bar as recited in claim 15, wherein a single heat exchanging fluid line serially passes the inkjet print heads mounted to the mounting assembly.

17. The print bar as recited in claim 15, wherein the heat exchanging fluid circuit including ducts arranged within a manifold for providing ink to the modules.

* * * * *